United States Patent
O'Gorman et al.

(10) Patent No.: US 11,495,065 B2
(45) Date of Patent: Nov. 8, 2022

(54) VEHICLE STATUS INDICATOR ASSEMBLY AND INDICATING METHOD

(71) Applicant: Ford Global Technologies, LLC, Dearborn, MI (US)

(72) Inventors: Ryan O'Gorman, Beverly Hills, MI (US); Hannah Bailey, Dearborn, MI (US); Aparna Velampudi, Troy, MI (US); Ankur Sharma, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 379 days.

(21) Appl. No.: 16/801,256

(22) Filed: Feb. 26, 2020

(65) Prior Publication Data
US 2021/0264699 A1 Aug. 26, 2021

(51) Int. Cl.
*G07C 5/08* (2006.01)
*H04W 4/40* (2018.01)

(52) U.S. Cl.
CPC ............ *G07C 5/0825* (2013.01); *H04W 4/40* (2018.02)

(58) Field of Classification Search
CPC ...... G07C 9/00309; G07C 2009/00793; G07C 9/00182; G07C 2209/63; G07C 2209/65; G07C 5/0825; G08B 25/008; G08B 29/185; G08B 19/005; G08B 27/003; H04W 4/40
USPC ....................................................... 340/5.72
See application file for complete search history.

(56) References Cited

U.S. PATENT DOCUMENTS

| | | | |
|---|---|---|---|
| 8,125,324 B2 | 2/2012 | Frey et al. | |
| 8,610,401 B2 | 12/2013 | Kim et al. | |
| 8,912,912 B2 | 12/2014 | Menard | |
| 2010/0052848 A1* | 3/2010 | Thunes | G07C 9/00309 340/5.64 |
| 2011/0187498 A1* | 8/2011 | Flaherty | G01S 19/14 340/5.72 |
| 2012/0133282 A1 | 5/2012 | Rubio et al. | |
| 2012/0242466 A1* | 9/2012 | Stillfried | B60Q 1/50 340/425.5 |
| 2013/0211623 A1* | 8/2013 | Thompson | B60L 3/0069 701/2 |
| 2014/0191859 A1 | 7/2014 | Koelsch | |
| 2015/0239307 A1* | 8/2015 | Horikoshi | B60C 23/0477 340/442 |
| 2016/0233706 A1 | 8/2016 | Woo et al. | |
| 2016/0243941 A1 | 8/2016 | Kishida | |
| 2017/0113650 A1* | 4/2017 | Caushi | G07C 9/00174 |
| 2019/0061549 A1 | 2/2019 | Miftakhov | |

FOREIGN PATENT DOCUMENTS

DE 102011010376 8/2012

* cited by examiner

*Primary Examiner* — Joseph H Feild
*Assistant Examiner* — Sharmin Akhter
(74) *Attorney, Agent, or Firm* — David B. Kelley; Carlson, Gaskey & Olds, P.C.

(57) ABSTRACT

An indicator assembly includes, among other things, a vehicle model that is configured to communicate with a vehicle. The indicator assembly further includes an indicator portion of the vehicle model. The indicator portion is configured to indicate a status of the vehicle based on a communication sent to the vehicle model.

17 Claims, 3 Drawing Sheets

VEHICLE STATUS INDICATOR ASSEMBLY AND INDICATING METHOD

TECHNICAL FIELD

This disclosure relates generally to a vehicle status indicator and, more particularly, to a vehicle status indicator provided by a vehicle model.

BACKGROUND

An individual may desire to monitor a status of a vehicle from a remote location. For example, an individual in an office may want to know a state of charge for their electrified vehicle parked outside the office. The individual could interact with a smartphone to obtain this information, but this requires the individual to take action to obtain the desired information.

SUMMARY

An indicator assembly according to an exemplary aspect of the present disclosure includes, among other things, a vehicle model that is configured to communicate with a vehicle. The indicator assembly further includes an indicator portion of the vehicle model. The indicator portion is configured to indicate a status of the vehicle based on a communication sent to the vehicle model.

In another example of the foregoing indicator assembly, the vehicle is an electrified vehicle that has a traction battery. The indicator portion is a traction battery indicator portion and the status is a charge status of the electrified vehicle.

In another example of any of the foregoing indicator assemblies, the indicator portion includes lighting devices.

In another example of any of the foregoing indicator assemblies, the indicator portion is a tire pressure indicator portion and the status is a tire pressure status of a tire of the vehicle.

In another example of any of the foregoing indicator assemblies, the communication is a wireless communication.

Another example of any of the foregoing indicator assemblies includes a wireless receiver of the vehicle model. The wireless receiver is configured to receive a wireless communication from a cloud server. The indicator portion is configured to indicate the status based on the wireless communication.

In another example of any of the foregoing indicator assemblies, the vehicle model is a scaled-down replica of the vehicle.

In another example of any of the foregoing indicator assemblies, the vehicle model is a three-dimensional model of the vehicle.

A vehicle status indicating method according to another exemplary aspect of the present disclosure, includes, among other things, receiving at a vehicle model a communication that indicates a status of the vehicle. The method further includes indicating the status of the vehicle on the vehicle model by adjusting an indicator portion of the vehicle model based on the communication.

In another example of the foregoing method, the vehicle is an electrified vehicle and the status is a charging status of the traction battery of the electrified vehicle.

In another example of any of the foregoing methods, the indicator portion includes lighting devices. The indicating includes illuminating a percentage of the lighting devices within the lighting devices in proportion to a state of charge of the traction battery.

In another example of any of the foregoing methods, the indicator portion includes lighting devices. The indicating includes flashing at least some of the lighting devices when the electrified vehicle is charging.

In another example of any of the foregoing methods, the status is a tire pressure status of a tire of the vehicle.

In another example of any of the foregoing methods, the vehicle model is three-dimensional model of the vehicle.

In another example of any of the foregoing methods, the communication is a Wi-Fi communication.

In another example of any of the foregoing methods, the status is a confirmation status. The indicator portion is adjusted a first way if the vehicle completes an action requested by the user. The indicator portion is adjusted a different, second way if the vehicle does not complete the action requested by the user.

In another example of any of the foregoing methods, the action requested by the user is requested by the user initiating a wireless command to the vehicle.

A vehicle status indicating method, according to yet another exemplary aspect of the present disclosure, includes sending a communication from a vehicle to a vehicle model of the vehicle. The communication includes a status of the vehicle. The vehicle model is configured to adjust an indicator portion of the vehicle model based on the communication to provide an indication of the status on the vehicle model.

In another example of the foregoing method, the vehicle is an electrified vehicle, and the vehicle model is a replica of the electrified vehicle.

In another example of any of the foregoing methods, the status is a charge status of the vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to monitoring a status of a vehicle. In particular, the disclosure relates to indicating the status on a vehicle model, which can be a scaled-down replica of the vehicle.

Figure 1:
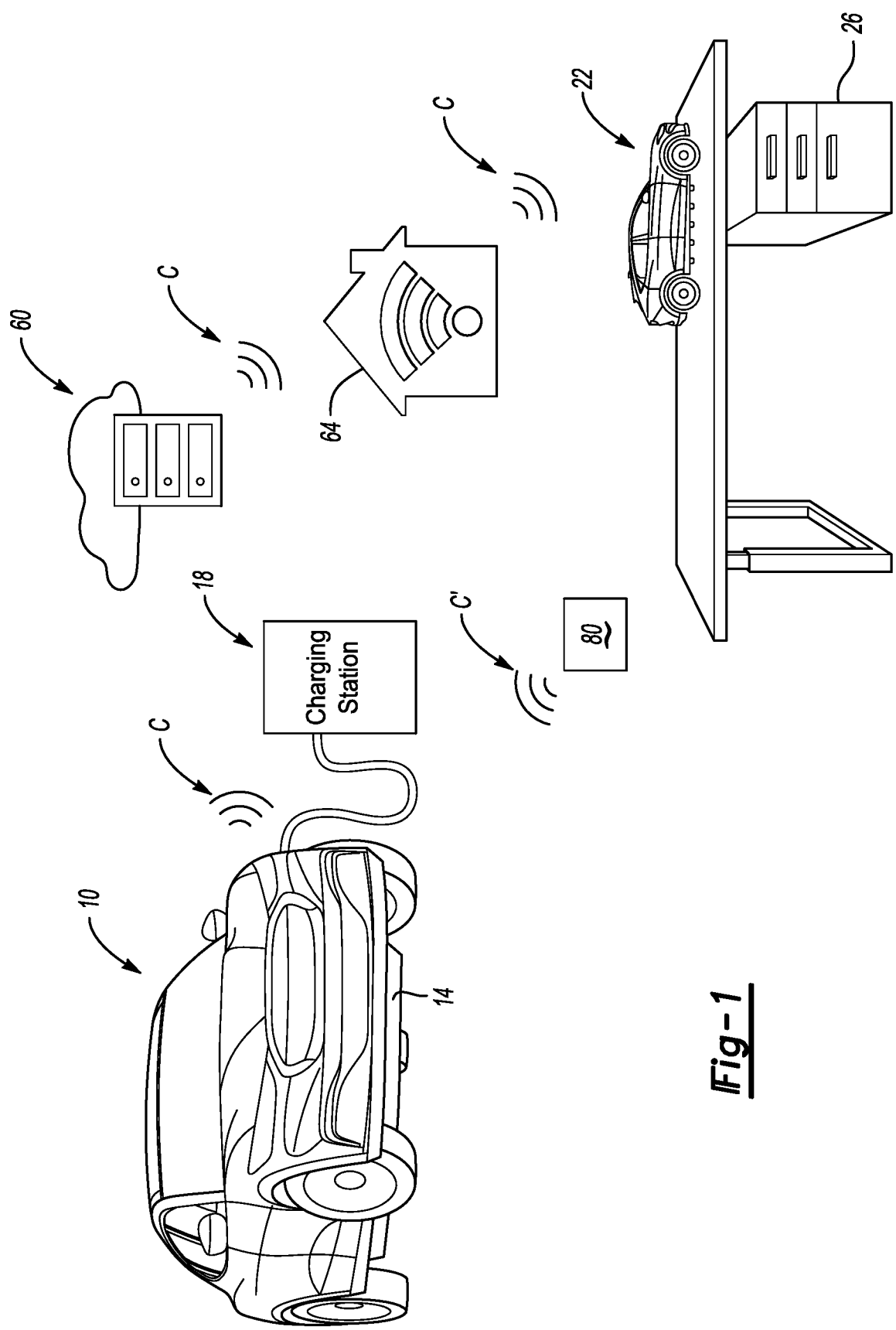
FIG. 1 illustrates a vehicle model and a vehicle according to an exemplary embodiment of the present disclosure.

With reference to FIG. 1, an example vehicle 10 is an electrified vehicle. The vehicle 10 has a traction battery 14.

A charging station 18 is shown charging the traction battery 14 of the vehicle 10. The vehicle 10 and the charging station 18 can be in a parking garage. An owner of the vehicle 10 may drive the vehicle 10 to the parking garage, exit the vehicle 10, and then couple the charging station 18 to the vehicle 10. The owner may then walk from the parking garage to an office building.

A vehicle model 22 is also shown in FIG. 1. In this example, the vehicle model 22 is a scaled-down, three-dimensional replica of the electrified vehicle 10. The vehicle model 22 is shown on a desk 26 within the office building. While working within the office building, the owner of the electrified vehicle 10 can view the vehicle model 22 upon the desk 26.

Figure 2:
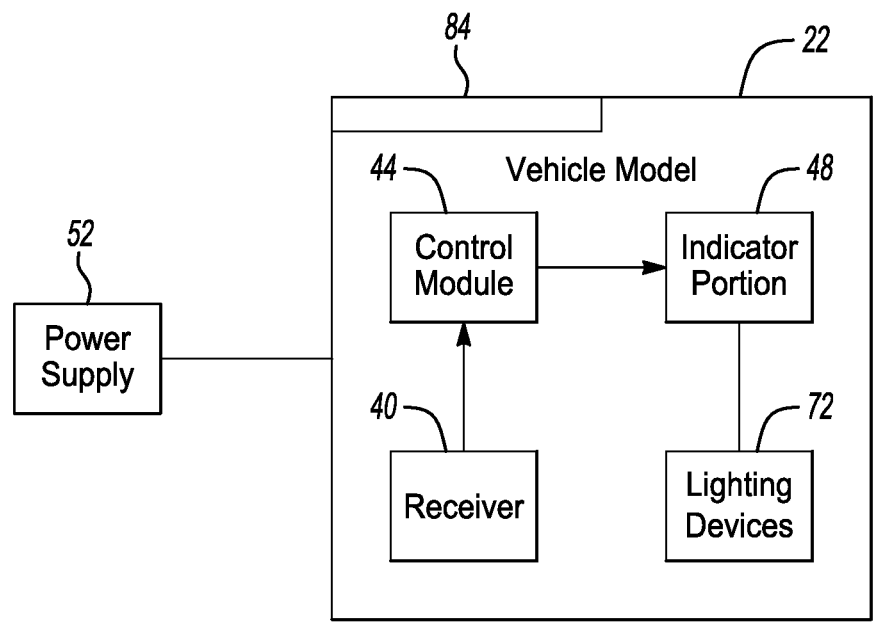
FIG. 2 illustrates a schematic view of the vehicle model of FIG. 1.
Figure 3:
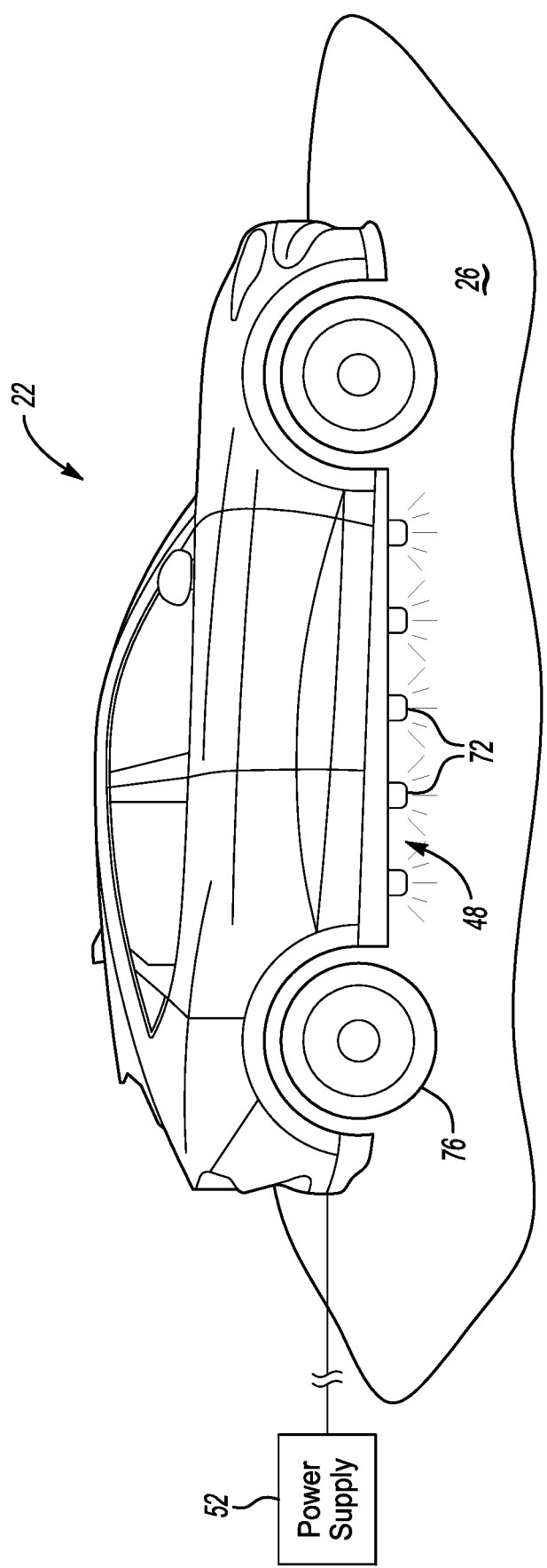
FIG. 3 illustrates a close-up, side view of the vehicle model of FIG. 1.

With reference now FIGS. 2 and 3 and continuing reference to FIG. 1, the vehicle model 22 includes a receiver 40, a control module 44, and an indicator portion 48. The vehicle model 22, in the exemplary embodiment, can be connected to a power supply 52.

Through the receiver 40, the vehicle model 22 can receive communications. The communications may originate from the vehicle 10. In the exemplary embodiment, a communication C originates from a transmitter within the vehicle 10 and is sent to a cloud server 60, which then relays the communication C to a Wi-Fi network 64 associated with the office building. Through the Wi-Fi network 64, the communication C is then transmitted to the vehicle model 22. The receiver 40 of the vehicle model 22 receives the communication C transmitted through the Wi-Fi network 64.

The control module 44 can initiate an action in response to the communication C. In the exemplary embodiment, the control module 44 adjusts the indicator portion 48 to visually indicate a status of the vehicle 10. The owner of the vehicle 10 can view the status provided by the indicator portion 48 of the vehicle model 22 when the owner is near the vehicle model 22 within the office building.

The control module 44 can continually update the indicator portion 48 in response to communications received by the vehicle model 22. The vehicle 10 can continually transmit communications to cause the control module 44 to continually update the indicator portion 48 as a status of the vehicle 10 is maintained or changed.

In the exemplary embodiment, the indicator portion 48 includes a plurality of lighting devices 72, such as light emitting diodes (LEDs). The status of the vehicle 10 can be visually indicated using the lighting devices 72 in various ways.

In an exemplary embodiment, the state of charge of the traction battery 14 is visually represented on the indicator portion 48 by illuminating a percentage of the lighting devices 72 in proportion to a state of charge of the traction battery 14 of the vehicle 10. If, for example, the communication C from the vehicle 10 informs the control module 44 that a state of charge of the vehicle 10 is forty percent, the control module 44 activates forty percent of the lighting devices 72. Here, the indicator portion 48 includes five lighting devices 72, so the control module 44 would activate two of the five lighting devices 72 when the communication C specifies that the state of charge of the traction battery 14 is forty percent.

If the vehicle 10 is charging from the charging station 18, the remaining three lighting devices 72 can blink to indicate that the vehicle 10 is charging.

As the state of charge of the traction battery 14 increases, additional lighting devices 72 may be illuminated without blinking to visually indicate the increasing state of charge. When the exemplary vehicle model 22 is fully charged, all five of the lighting devices 72 are illuminated without blinking.

As outlined above, the owner of the vehicle 10 can then observe the vehicle model 22 and quickly comprehend the state of charge of the traction battery 14.

In an exemplary embodiment, the control module 44 could command the lighting devices 72 to illuminate in different colors to visually indicate the state of charge of the traction battery 14. As an example, if the state of charge of the traction battery 14 is forty percent, the control module 44 could command forty percent of the lighting devices 72 to be illuminated in a green color, and the remaining sixty percent of the lighting devices 72 illuminated in a red color. In another example, the control module 44 could command all the lighting devices 72 to illuminate in a red color when the state of charge of the traction battery 14 is below, say 25 percent. The control module 44 could command all of the lighting devices 72 to illuminate in a yellow color when the state of charge of the traction battery 14 is from 26 to 75 percent. Should the state of charge of the traction battery 14 rise above 75 percent, the control module 44 could command some or all of the lighting devices 72 to illuminate in a green color.

In an exemplary embodiment, if the traction battery 14 has a relatively low state of charge, the control module 44 could command some or all of the lighting devices 72 to be illuminated with a first intensity. As the state of charge increases, the control module 44 can cause the intensity of light emitted from the lighting devices 72 to gradually increase.

In an exemplary embodiment, the control module 44 could command some or all of the lighting devices 72 to flash, which can visually indicate to the owner that the traction battery 14 is currently charging. If the charging stops, the control module 44 could stop flashing the lighting devices 72.

Activating some or all of the lighting devices 72, changing the color of the lighting devices 72, changing an intensity of light emitted from the lighting devices 72, and flashing the lighting devices 72 are exemplary methods of using the vehicle model 22 to indicate a status of the vehicle 10. The methods could be used alone or in combination. Other methods could be used in other examples.

Notably, the lighting devices 72 of the exemplary indicator portion 48 are disposed on an underside of the vehicle model 22, which corresponds to the location of the traction battery 14 within the vehicle 10. This can help an observer of the vehicle model 22 understand that the indicator portion 48 of the exemplary embodiment is an indicator portion representing a status of the traction battery 14 of the vehicle 10.

As described above, the status of the vehicle 10 that is visually indicated by the lighting devices 72 of the indicator portion 48 is a charging status of the traction battery 14. The status of the vehicle 10 can be something other than a charging status. As an example, the status could be a tire pressure status of the vehicle 10. In such an example, the indicator portion 48 could include lighting devices within or near a rear passenger tire 76 of the vehicle model 22. The lighting devices associated with the rear passenger tire 76 of the vehicle model 22 could be commanded to illuminate by the control module 44 if a rear passenger tire of the vehicle 10 has a tire pressure that changes and falls below a threshold value. The control module 44 can command the lighting device of the indicator portion 48 that is located within or near the rear passenger tire 76 to illuminate in a red color, which helps an observer of the vehicle model 22 understand the specific tire on the vehicle 10 that has experienced the drop in tire pressure.

The status could also be a fault status of the vehicle 10. For example, if an engine of the vehicle 10 experiences a fault, the vehicle model 22 can include a lighting device within an indicator portion that is flashed with a red color.

Another status of the vehicle 10 that could be provided by the vehicle model 22 can be considered a confirmation status that confirms an action taken by the owner. For example, if the owner of the vehicle 10 remotely starts the vehicle 10 while the owner is seated at the desk 26, the control module 44 could flash lighting devices of the indicator portion 48 in a green color. This can visually indicate to the owner that the remote start was successful. If the remote start was not successful, the vehicle model 22 could the control module 44 could flash lighting devices of the indicator portion 48 in a red color. The lighting devices may be illuminated in a blue color if an air conditioning of the vehicle 10 is cooling the vehicle 10 after the remote start. The lighting devices may be illuminated in a red color if a heater of the vehicle 10 is heating the vehicle 10 after the remote start.

As another example confirmation status, the vehicle model 22 includes lighting devices of the indicator portion 48 within the area of the vehicle model 22 representing the headlights and taillights of the vehicle 10. These lights could flash in response to the owner locking or unlocking the vehicle 10 thereby providing a confirmation status to the owner.

In examples where the indicator portion 48 is providing a confirmation status, a communication C' could be transmitted to the vehicle 10 from, for example, a keyfob 80 (FIG. 1) or handheld device. In particular, the owner could activate a button on the keyfob 80 to transmit the communication C'. The vehicle 10 can remote start in response to the communication C', which may be send directly from the keyfob 80 to the vehicle 10, or pass through, for example, the cloud server 60.

After the vehicle 10 receives the communication C', the vehicle 10 transmits the communication C, which leads to the control module 44 adjusting the indicator portion 48. The communication C, as previously described, can originate from the vehicle 10 and, optionally, pass through the cloud server 60 and the Wi-Fi network 64 until being received at the vehicle model 22.

The communication path from the vehicle 10 to the vehicle model 22 could instead or additionally extend through a personal device, such as the keyfob 80 or a smartphone. For example, rather than the communication C passing from the vehicle 10, to the cloud server 60, to the Wi-Fi network 64, and then to the vehicle model 22, the communication C could, optionally, pass from the cloud server 60 to the keyfob 80, and then to the vehicle model 22. If a smartphone is used, the smartphone could have a dedicated application that enables the vehicle model 22 to connect to the Wi-Fi network 64. The application can further permit registering the vehicle model 22 to enable communications with the vehicle model 22.

The communication path from the vehicle 10 to the vehicle model 22 could instead extend directly from the vehicle 10 to the Wi-Fi network 64 of the vehicle model 22 without being routed through the cloud server 60.

The communications C and C' can utilize a key system to facilitate secure communications. A first digital key could be assigned to the vehicle model 22 as a product key. The digital key of the vehicle model 22 could be a common digital key that is used for all vehicle models of the vehicle 10. A second digital key can then be assigned for the vehicle 10. The first digital key enables the vehicle model 22 to be identified by, for example, the cloud server 60. The second digital key can allow the vehicle model 22 to access data specific to the vehicle 10.

In some examples, the vehicle model 22 includes a touch sensitive surface 84. The owner can interact with the touch sensitive surface 84 to cause initiate certain actions with the vehicle 10. The owner could, for example, double tap the touch sensitive surface 84 providing a signal to the control module 44. In response, the control module 44 causes a communication to be transmitted from the vehicle model 22 to the vehicle 10. The communication can cause the vehicle 10 to start.

The vehicle model 22 could include a demonstration mode, which allows the owner to manually activate one or more of the lighting devices of the indicator portion 48.

The vehicle model 22 could permit the owner to choose the specific type of status will be provided. The vehicle model 22 could permit the owner to choose the color in which the lighting devices 72 will illuminate. These choices can, in an example, be made through an application on a smartphone.

The vehicle model 22 is a physical model of the vehicle 10, and is thus not a digital representation of the vehicle 10. Put another way, a digital image of the vehicle 10 would not be a vehicle model. The vehicle model 22 can be a 1:32, 1:24, or 1:18 scale replica in some examples.

In this example, the vehicle model 22 is a die cast replica of the vehicle 10. The vehicle model 22 is, in other examples, is a three-dimensionally printed model of the vehicle 10.

Figure 4:
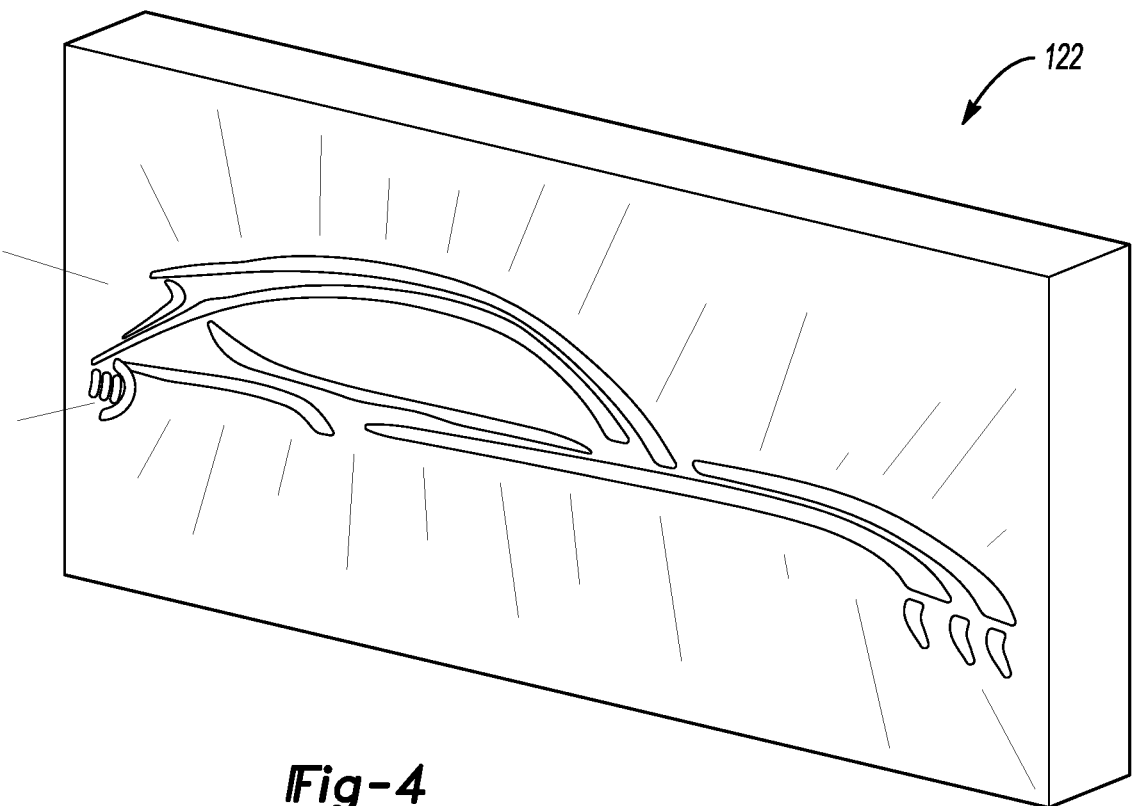
FIG. 4 illustrates a perspective view of a vehicle model according to another exemplary embodiment of the present disclosure.

While the exemplary vehicle model 22 is a three-dimensional replica of the vehicle 10, the vehicle model could take other forms. For example, with reference to FIG. 4, another example vehicle model 122 is a two-dimensional die cut silhouette 124 of the vehicle 10. The silhouette 124 could be illuminated in different colors to represent the status the vehicle 10. When not charging, the headlights of the silhouette 124 can be backlit in a white color, the taillights backlit in a red color, and the interior backlit in a red or blue color. When charging, or to provide an indication of charging, the entire silhouette 124 could be illuminated in green when the state of charge is relatively high, and illuminated in red when the state of charge is relatively low.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:
1. An indicator assembly, comprising:
   a vehicle model that is configured to communicate with a vehicle; and
   an indicator portion of the vehicle model, the indicator portion configured to provide an indication that the vehicle has completed an action in response to a first communication sent from a keyfob to the vehicle, the indicator portion providing the indication based on a second communication sent to the vehicle model from the vehicle, wherein the vehicle model is a three-dimensional model of the vehicle.

2. The indicator assembly of claim 1, wherein the vehicle is an electrified vehicle having a traction battery, wherein the indicator portion includes a traction battery indicator portion configured to provide an indication of a charge status of the electrified vehicle.

3. The indicator assembly of claim 1, further comprising a plurality of lighting devices, the indicator portion including the plurality of lighting devices.

4. The indicator assembly of claim 1, wherein the indicator portion includes a tire pressure indicator portion configured to provide an indication of a low tire pressure status of at least one tire of the vehicle, the tire pressure indicator portion configured to illuminate at least one tire of the vehicle model, the at least one tire of the vehicle model corresponding to the at least one tire of the vehicle having the low tire pressure status.

5. The indicator assembly of claim 1, wherein the first and second communications are wireless communications.

6. The indicator assembly of claim 1, further comprising a wireless receiver of the vehicle model, the wireless receiver configured to receive a wireless communication from a cloud server, the indicator portion configured to indicate the status based on the wireless communication.

7. The indicator assembly of claim 1, wherein the status included in the second communication is a confirmation status that causes the indicator portion to adjust in a way that confirms the action initiated in response the first communication.

8. A vehicle status indicating method, comprising:
receiving, at a vehicle model, a communication that includes a confirmation status of a vehicle; and
indicating the confirmation status of the vehicle on the vehicle model by adjusting an indicator portion of the vehicle model based on the communication, wherein the indicator portion is adjusted a first way if the vehicle completes an action requested by a user, and the indicator portion is adjusted a different, second way if the vehicle does not complete the action requested by the user, wherein the vehicle model is a three-dimensional model of the vehicle.

9. The vehicle status indicating method of claim 8, wherein the vehicle is an electrified vehicle and further comprising indicating a charging status of a traction battery of the electrified vehicle by adjusting the indicator portion of the vehicle model based on another communication.

10. The vehicle status indicating method of claim 9, wherein the indicator portion includes a plurality of lighting devices, wherein the indicating comprises illuminating a percentage of the lighting devices within the plurality of lighting devices in proportion to a state of charge of the traction battery.

11. The vehicle status indicating method of claim 9, wherein the indicator portion includes a plurality of lighting devices, wherein the indicating comprise flashing at least some of the plurality of lighting devices when the electrified vehicle is charging.

12. The vehicle status indicating method of claim 8, wherein the status is a tire pressure status of at least one tire of the vehicle.

13. The vehicle status indicating method of claim 8, wherein the action requested by the user is requested by the user initiating a wireless command to the vehicle.

14. The vehicle status indicating method of claim 8, wherein the wireless command is sent from a keyfob that is separate and distinct from the vehicle model.

15. A vehicle status indicating method, comprising:
at a vehicle, receiving a first communication from a keyfob;
in response to the first communication, initiating an action at the vehicle; and
sending a second communication from the vehicle to a vehicle model of the vehicle, the second communication including a status of the vehicle, wherein the vehicle model is configured to adjust an indicator portion of the vehicle model based on the second communication to provide an indication of the status on the vehicle model, wherein the vehicle is an electrified vehicle, and the vehicle model is a replica of the electrified vehicle.

16. The vehicle status indicating method of claim 15, wherein the status included in the second communication is a confirmation status that causes the indicator portion to adjust in a way that confirms the action initiated in response the first communication.

17. The vehicle status indicating method of claim 15, where the keyfob is separate and distinct from the vehicle model.

* * * * *

UNITED STATES PATENT AND TRADEMARK OFFICE
CERTIFICATE OF CORRECTION

PATENT NO. : 11,495,065 B2
APPLICATION NO. : 16/801256
DATED : November 8, 2022
INVENTOR(S) : Ryan O'Gorman et al.

It is certified that error appears in the above-identified patent and that said Letters Patent is hereby corrected as shown below:

In the Claims

Claim 6, Column 7, Line 29; replace "indicate the status based" with --provide the indication based--

Claim 7, Column 7, Line 30; replace "the status" with --a status--

Claim 14, Column 8, Line 21; replace "claim 8" with --claim 13--

Signed and Sealed this
Third Day of January, 2023

Katherine Kelly Vidal
*Director of the United States Patent and Trademark Office*